(12) United States Patent
Shimizu et al.

(10) Patent No.: US 6,879,467 B2
(45) Date of Patent: Apr. 12, 2005

(54) CARRIAGE ARM ASSEMBLY FOR LOCATING MAGNETIC HEAD, AND MAGNETIC DISK APPARATUS USING THE SAME

(75) Inventors: Toshihiko Shimizu, Yasato (JP);
Tetsuya Hamaguchi, Chiyoda (JP);
Toshihiro Arisaka, Odawara (JP);
Hiromitsu Masuda, Odawara (JP);
Gentaro Nakamura, Odawara (JP);
Takenori Atsumi, Chiyoda (JP)

(73) Assignee: Hitachi Global Storage Technologies Japan, Ltd., Kanagawa (JP)

( * ) Notice: Subject to any disclaimer, the term of this patent is extended or adjusted under 35 U.S.C. 154(b) by 92 days.

(21) Appl. No.: 10/157,087

(22) Filed: May 30, 2002

(65) Prior Publication Data

US 2003/0081356 A1 May 1, 2003

(30) Foreign Application Priority Data

Oct. 30, 2001 (JP) .......................................... 2001-331842
Nov. 8, 2001 (JP) .......................................... 2001-342665

(51) Int. Cl.$^7$ ............................................. G11B 23/00
(52) U.S. Cl. .................................................. 360/265.9
(58) Field of Search ............................. 360/265.9, 266, 360/294.4

(56) References Cited

U.S. PATENT DOCUMENTS 5,905,608 A * 5/1999 Frees et al. ............... 360/265.9
5,936,808 A * 8/1999 Huang et al. ............. 360/265.9
6,088,194 A * 7/2000 Imaino et al. ........... 360/294.3

* cited by examiner

*Primary Examiner*—A. J. Heinz
*Assistant Examiner*—Mark Blouin
(74) *Attorney, Agent, or Firm*—Antonelli, Terry, Stout & Kraus, LLP.

(57) ABSTRACT

According to the invention, there is provided a carriage arm assembly including a carriage arm having two arm members. The arm member is constructed in such a way that the width of its coil side end and the width of its suspension side end are narrower than that of its intermediate area. This construction widens a servo band width, improves positioning accuracy, and reduces positioning errors of a magnetic disk apparatus, so that recording density is improved and storage capacity is increased. Further, by coupling two arm members using a restriction member via a visco-elastic member, it is possible to achieve a high damping effect on various vibration modes including in-plane bending of the arms, and suppress vibration of the carriage so as to reduce the positioning errors.

11 Claims, 16 Drawing Sheets

INERTIAL FORCE

CARRIAGE ARM ASSEMBLY FOR LOCATING MAGNETIC HEAD, AND MAGNETIC DISK APPARATUS USING THE SAME

BACKGROUND OF THE INVENTION

1. Field of the Invention

The present invention relates to a magnetic disk apparatus, and more particularly to a carriage arm assembly used for positioning a magnetic head of the magnetic disk apparatus.

2. Description of the Prior Art

In the field of a magnetic disk apparatus, it has been required to improve recording density thereof to increase recording capacity. For this purpose, it is important to improve accuracy in positioning a magnetic head. However, as obstacles to the improvement of the positioning accuracy, there are a positioning error due to vibration of a mechanical system caused by rotating a disk or moving a carriage arm assembly, and a positioning error caused when vibration is added from the outside of the magnetic disk apparatus. Accordingly, effective methods for reducing these positioning errors are to widen a servo band width, and to reduce the vibration caused by the mechanical system.

To widen the servo band width is greatly effected by a primary vibration mode or a main resonance mode with respect to a transfer characteristic of the carriage arm assembly, in which modes the input is defined as a force generated in a coil, and the output is defined as a displacement amount of the magnetic head in the positioning direction. This main resonance mode is the same deformation mode with the "lateral bending system mode" in a document of "Analytical and Experimental Study of the Effect of Base-Plate and Top Cover Stiffness on Actuator and Disk pack Dynamics" (Yih-Jen Dennis et al., 10th Annual Symposium on Information Storage and Processing Systems, Jun. 28 to 30, 1999), the "butterfly mode" in a document of "Active Damping in HDD Actuator" (Fu-Ying Huang et al., IEEE TRANSACTIONS ON MAGNETICS, VOL. 37, No. 2., March 2001), and the "QR mode" in a document of "Development of a Single Coil Coupled Force VCM Actuator for High TPI Magnetic Recording" (Huai Lin et al., IEEE TRANSACTIONS ON MAGNETICS, VOL. 37, No. 2., March 2001).

In the case of widening the servo band width, one of restrictions is a gain margin in a natural frequency of the main resonance mode (hereinafter referred to as "main resonance frequency"). If the main resonance frequency is low with respect to the servo band width, or amplitude is large, the gain margin is reduced, and in the worst case, the control system becomes oscillated, so that the positioning control cannot be achieved. In other words, it is possible to secure the gain margin to widen the servo band width by raising the main resonance frequency or decreasing the gain in the transfer characteristic. For example, JP-A-2000-48497 discloses an example in which the main resonance frequency is heightened by changing coupling method of a bearing of the carriage arm assembly so as to improve the rigidity. Further, JP-A-09-161430 shows an example which is designed so that the magnetic head is not displaced in the main resonance mode, however, the example has not been applied to an actual apparatus.

On the other hand, the vibration caused by the mechanical system during the positioning operation of the carriage arm assembly is mainly generated by excitation of each part of the carriage arm assembly due to driving force input to the carriage arm assembly for positioning the head on a target track during the moving operation from one track to another track.

Especially, a vibration mode in which in-plane bending of the carriage arm (hereinafter simply referred to as "arm") is considered is greatly on the positioning accuracy of the carriage arm assembly because the head is disposed at an end of the arm and thus is swung around in the case of an swing type of carriage arm assembly. As this kind of vibration mode, there are the above-described main resonance mode, and an arm in-plane bending primary mode, for example. In this main resonance mode, deformation of the bearing section and bending deformation of the overall carriage arm assembly are combined. Further, in the arm in-plane bending primary mode, each of a plurality of arms deforms just like primary bending of a cantilever.

In addition, there is a problem that residual vibration in the positioning operation increases the time until starting to read/write data, so that the reading/writing speed of the disk apparatus is reduced. An example of the method of reducing the residual vibration is shown in JP-A-11-66773, which reduces the vibration using a tuned mass damper.

BRIEF SUMMARY OF THE INVENTION

The main resonance mode is a mode in which the deformation of the bearing section and the deformation of the overall carriage arm assembly are combined. Thus, in order to raise the main resonance frequency, it is effective to increase the overall rigidity of the bearing and the carriage arm assembly, or reduce the weight of the carriage arm assembly. However, in an actual magnetic disk apparatus, it is coming to a critical limit to increase the rigidity of the bearing. Regarding the carriage arm assembly, the drastic increase of the rigidity and the weight reduction are contradictory to each other, and thus it is difficult to drastically heighten the main resonance frequency. That is, it is now coming closer to the critical limit to widen the servo band width by raising the main resonance frequency.

In an example shown in JP-A-9-161430, the displacement of the magnetic head is 0 (in the main resonance mode), and thus it is possible to drastically widen the servo band width in the sense that the main resonance mode will have no effect on the control system. However, in the actual magnetic disk apparatus, the shape of the main resonance mode itself varies due to manufacturing variation such as a machining tolerance, and therefore the displacement of the magnetic head does not always become 0. Thus, it is unavoidable that the magnetic head is displaced to a certain extent. In this case, the displacement direction of the magnetic head is sometimes the same as the displacement direction of the coil, which is an input point, and sometimes opposite to the displacement direction of the coil, because of individual differences of the carriage arm assemblies. This means that the observed displacement of the magnetic head varies between positive and negative, in other words, the phase in the main resonance mode with respect to the transfer characteristic cannot be fixed in the positive or the negative, where the positive phase is defined as that the head is displaced in an opposite direction to a coil displaced direction, and the negative phase is defined as that the head is displaced in the same direction with the coil displaced direction.

A similar phenomenon occurs, even in one magnetic disk apparatus, due to temperature variation. Generally, a bearing used in the carriage of the magnetic disk apparatus is pressurized at a constant position in view of the manufacturing cost. If ambient temperature of the magnetic disk apparatus changes, the bearing section expands or contracts due to the temperature variation which varies the amount of pressure on the bearing. Accordingly, the rigidity of the bearing section in the main resonance mode is changed, so that the displacement of the bearing section is fluctuated, in other words, the phase of the main resonance mode in the transfer characteristic cannot be defined as the positive or the negative, as with the case of the manufacturing variation.

Inversion between the positive and the negative phases means that the output is inverted between the positive and the negative even if a constant input is added. Thus, if providing a compensator for controlling negative phase vibration in the main resonance mode by means of feedback control, positive phase of the main resonance mode becomes excited by the feedback control system. Therefore, under a condition in which the phase of the main resonance mode is indeterminate as positive or negative, it is difficult for the feedback control system to control vibration of the main resonance mode.

For the above reason, it is difficult to achieve a magnetic disk apparatus described in JP-A-9-161430 specification, in which apparatus the displacement of the magnetic head in the main resonance mode is defined as 0.

On the other hand, in the method of using a tuned mass damper for compensating the vibration of the carriage arm assembly, which vibration is defined as residual vibration when positioning the head, there is a problem that it is difficult to make an adjustment into the frequency of the target vibration mode. When high damping is not added by using the tuned mass damper, it is necessary to accurately adjust into the frequency of the target vibration, and even if the adjustment deviates from the target vibration slightly the effect wears off immediately. Further, even if using a material having a high damping effect in view of the frequency variation, the vibration reduction effect will be also reduced.

In the case of using the high damping material, however, by directly applying the material to the residual vibration generating part, it is possible to effectively reduce the amplitude of the residual vibration, and to improve convergence of the vibration, so that fine adjustment cannot be omitted.

It is an object of the invention to solve the above problems by providing a magnetic disk apparatus having improved recording density and large recording capacity in which the servo band width is widened for improving positioning accuracy and for reducing positioning errors.

It is another object of the invention to provide a magnetic disk apparatus capable of reducing residual vibration generated by head positioning operation, and improving the reading/writing speed, so that high speed transferring is achieved.

According to a first aspect of the invention, in order to solve the above-described problems, there is provided a carriage arm assembly including a carriage arm which includes a suspension fixing portion and two arm members disposed in quail-parallel to a disk surface, each of which arm members has a coil side end area and a suspension side end area which have smaller rigidity than that of a central area thereof. This feature makes the carriage arm to be easily deformable in the coil side end area and the suspension side end area, so that it possible to reduce displacement of a magnetic head in the main resonance mode. Further, this feature reduces influences of the main resonance mode on the control system, widens a servo band width and increases recording density. In order to make the coil side end area and the suspension side end area of the arm member to have smaller rigidity than the central area, it may be also possible to make the widths of the coil side end area and the suspension side end area of the arm member smaller than that of the central area thereof. Preferably, the width of the arm member is widen in the direction quasi-parallel to the surface of the magnetic disk in consideration of interference with the magnetic disk. However, it should be noted that it is also possible to widen the width of the central area of the arm in the direction perpendicular to the surface of the magnetic disk. Therefore, the present invention can adjust the mode displacement of the magnetic head in the main resonance mode by changing the shape of the arm member of the carriage arm. Moreover, since the phase is not inverted in the main resonance mode, the present invention is applicable to an actual disk apparatus.

However, it is also possible to construct the carriage arm in such a way that the mode displacement of the magnetic head in the main resonance mode is adjusted so as to prevent the phase from inverting in the main resonance mode, without the need for the above-configuration in which the coil side end area and the suspension side end area of the arm member have smaller rigidity than the central area of the arm member.

According to a second aspect of the invention, in solve the above-described problems, there is provided a carriage arm assembly having a carriage arm which includes a first arm member and a second arm member placed side by side in parallel to a disk surface, which arm members are coupled with each other by using a damping material inserted therebetween. In the vibration mode including in-plane bending of the arm, relative displacement takes place between the first arm member and second arm member, so that large distortion is caused in the damping material provided between the arm members, thereby it makes possible to enhance the damping effect of the damping material.

Furthermore, by making the rigidity of the central areas of the first arm member and second arm member higher than that of the coil side end area and suspension side end are, it is possible to further enhance the damping effect. In the case of comparing the same head displacement in arm bending deformation, the rigidity of the end areas is relatively low, so that no deformation occurs in the area of a large width in the center, and the deformation occurs at the end areas instead. This feature increases relative displacement between the first arm member and second arm member, so as to produce greater distortion. Accordingly, this further enhances the damping effect of the damping material.

Further, by providing damping members on both ends of rigid members having higher rigidity than the damping material, more specifically on both ends of a laminated material (hereinafter referred to as "restricting material"), and by putting this damping materials on planes quasi-parallel to the disk surface in the central area of the first arm member and the central area of the second arm member, it becomes possible to paste the damping material in the areas having a large width in the center. This feature increases the area of the damping material, widens the area producing a damping effect, and can thereby further enhance the effect.

It is also possible to couple the first arm member the second arm member only via an elastic member without using a restricting member, in which the first arm member and the second arm member generate relative displacement therebetween so as to produce distortion in the elastic material. This feature can produce a high damping effect.

Thus, it is possible to reduce the cost by eliminating the restricting material.

The features of the present invention have been descried in the above. Other features of the present invention will become more apparent by the following description of embodiments of the present invention.

Other objects, features and advantages of the invention will become apparent from the following description of the embodiments of the invention taken in conjunction with the accompanying drawings.

DETAILED DESCRIPTION OF THE INVENTION

Embodiment 1

Figure 1:
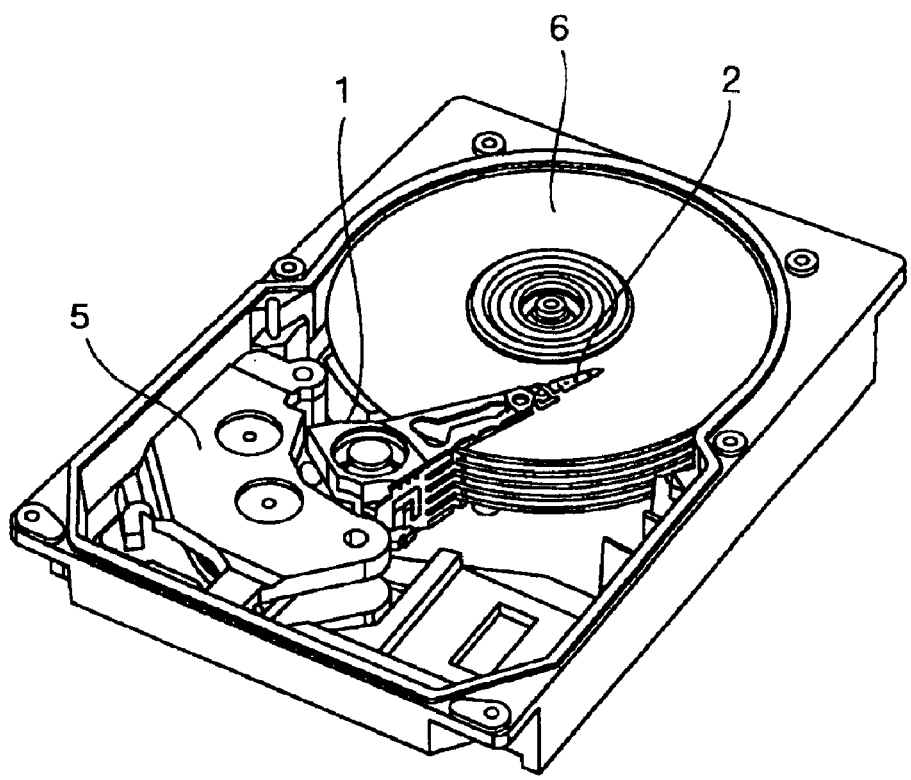
FIG. 1 is a perspective view of a magnetic disk apparatus using a carriage arm assembly according to a first embodiment of the present invention.
Figure 2:
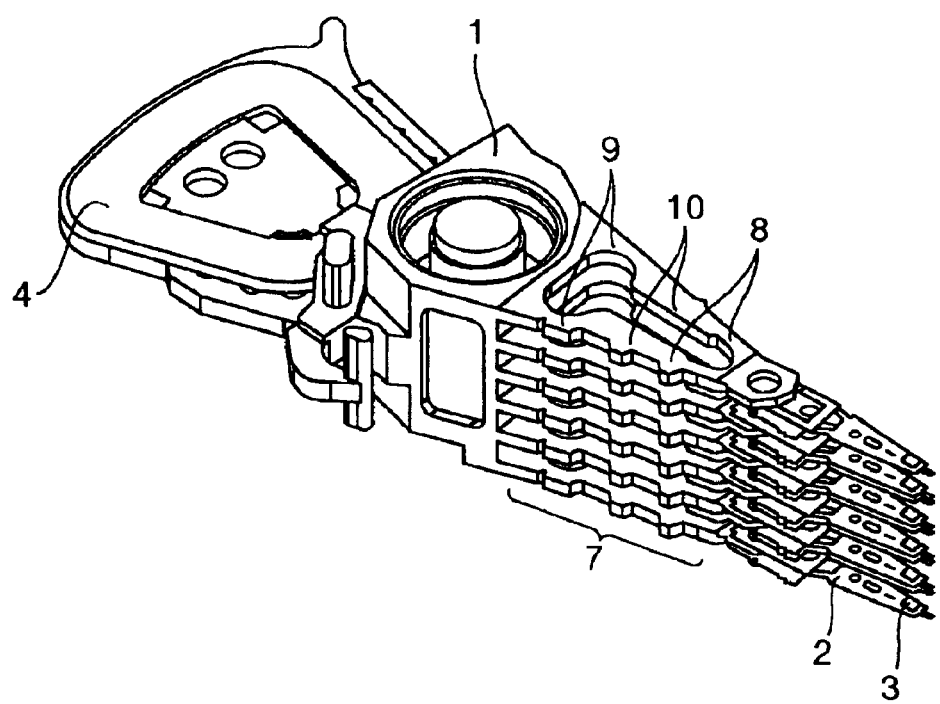
FIG. 2 is a perspective view of the carriage arm assembly according to the first embodiment of the present invention.
Figure 3:
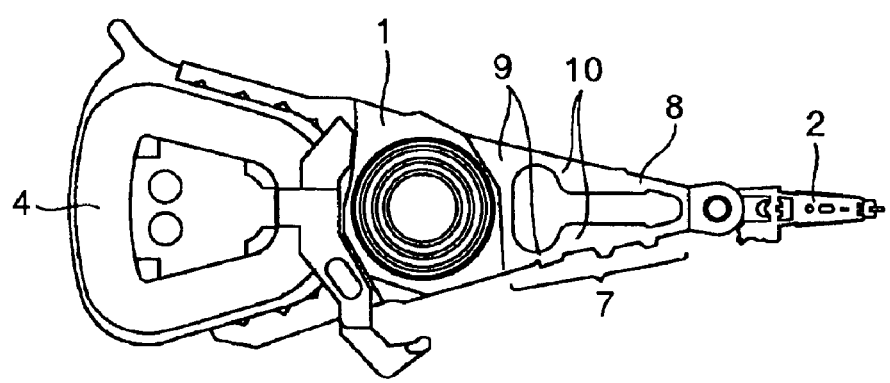
FIG. 3 is a top view of the carriage arm assembly according to the first embodiment of the present invention.

Referring to FIG. 1, FIG. 2 and FIG. 3, a slider 3 including a magnetic head (not shown) is mounted at the end of a carriage 1 via a suspension 2. When a current flows through a coil 4, a force is generated between a voice coil motor 5 and the coil 4, so that the carriage 1 rotates around a bearing section and thereby can position the slider 3 at an arbitrary radial position on a disk 6. The carriage 1 includes a carriage arm 7, and the carriage arm 7 has such a configuration in which the widths of the two arm members, corresponding to a front end area 8 and a back end area 9, are smaller than the width of a central (intermediate) area 10.

Figure 4:
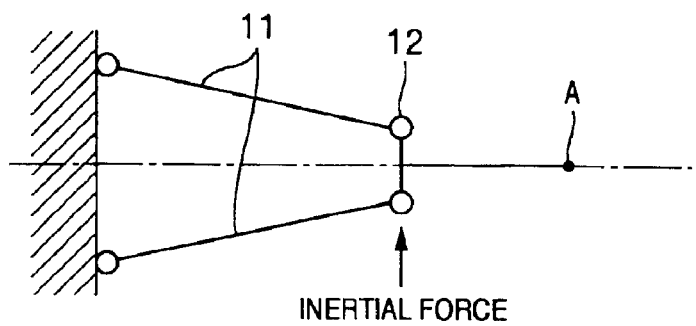
FIG. 4 is a schematic view of the first embodiment of the present invention.
Figure 5:
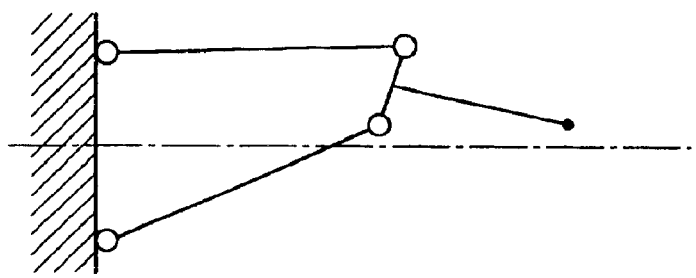
FIG. 5 is a drawing showing principles of operation of the first embodiment of the present invention.

FIG. 4 and FIG. 5 illustrate principles of operation of the present invention. In the examples in FIG. 1 to FIG. 3, since the widths of the front end area 8 of the arm member and the back end area 9 of the arm member of the carriage arm 7 are smaller than the width of the central area 10 of the arm member, the present invention can be modeled so as to have a 4-node link structure expressed with rigid sections 11 and rotation sections 12 as shown in FIG. 4. Point A in FIG. 4 is a virtual position of the magnetic head. Furthermore, a force acting on the carriage arm 7 in a main resonance mode can be regarded as an inertial force acting on the carriage arm 7 and is equivalent to a force input as shown in FIG. 4. When the force input shown in FIG. 4 is generated, the deformation as shown in FIG. 5 occurs in view of a geometric relationship of a rigid section 11, which can reduce the displacement of point A showing the position of the magnetic head. This means that it is possible to reduce mode displacement of the magnetic head in the main resonance mode in the actual magnetic disk apparatus, and reduce the amplitude of the main resonance in the transfer characteristic.

Figure 6:
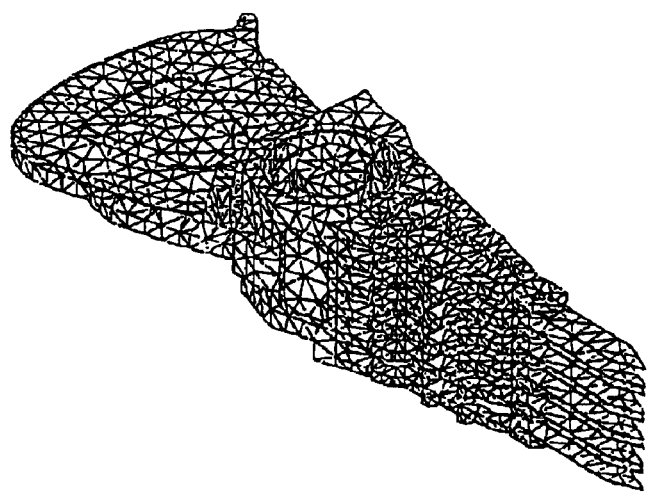
FIG. 6 is a finite element model of the first embodiment of the present invention.
Figure 7:
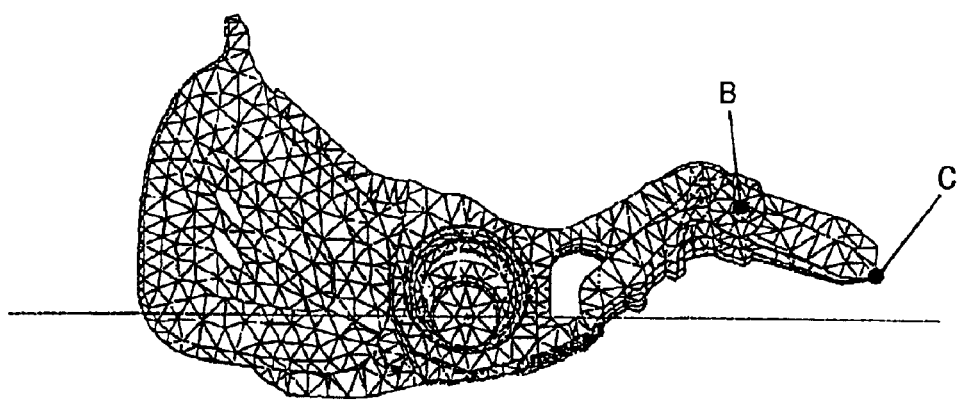
FIG. 7 is a finite element analysis result in a main resonance mode of the first embodiment of the present invention.
Figure 8:
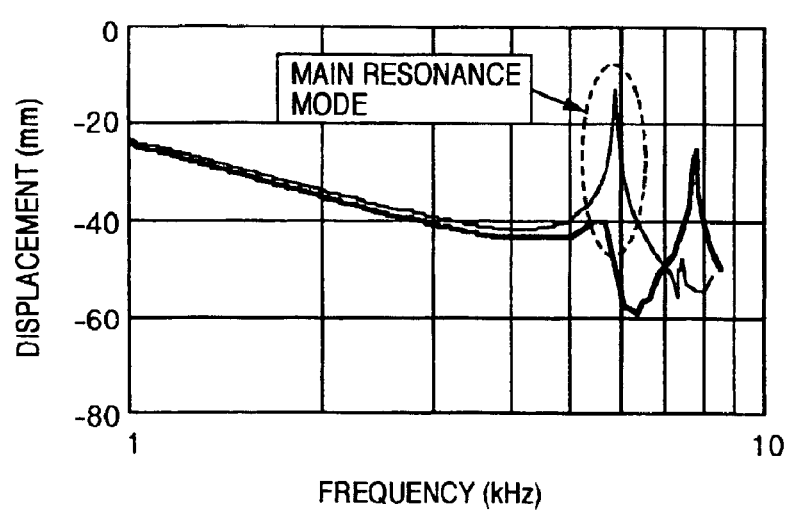
FIG. 8 illustrates a transfer characteristic of the first embodiment of the present invention.

Each section of the carriage arm 7 of the actual carriage is rigid, and not rotation free, and therefore can be shown as the finite element model shown in FIG. 6 used for an analysis to check the deformed shape in FIG. 5. FIG. 7 shows a deformed shape in the main resonance mode. As shown in FIG. 7, the displacement at point C, which is the magnetic head, is smaller than the displacement at point B, which is the edge of the carriage arm 7, and the carriage arm 7 is deformed as shown in FIG. 5. FIG. 8 shows a transfer characteristic, which is a displacement in the direction of positioning the magnetic head when a unit force is input (IN) to the coil section. The horizontal axis shows a frequency, the vertical axis shows a decibel value of displacement (mm), the solid line shows a transfer characteristic of the present invention and the narrow line shows a transfer characteristic of a carriage according to a conventional system. From FIG. 8, it is clearly understandable that the amplitude in the main resonance mode is reduced compared to the conventional system.

As described above, the present invention can widen the servo band width compared to the conventional system.

Furthermore, even if the shape of the main resonance mode changes due to manufacturing variation or variation in the operating environment, the phase of the magnetic head is not inverted, and the present invention is therefore applicable to the actual magnetic disk apparatus.

Embodiment 2

Figure 9:
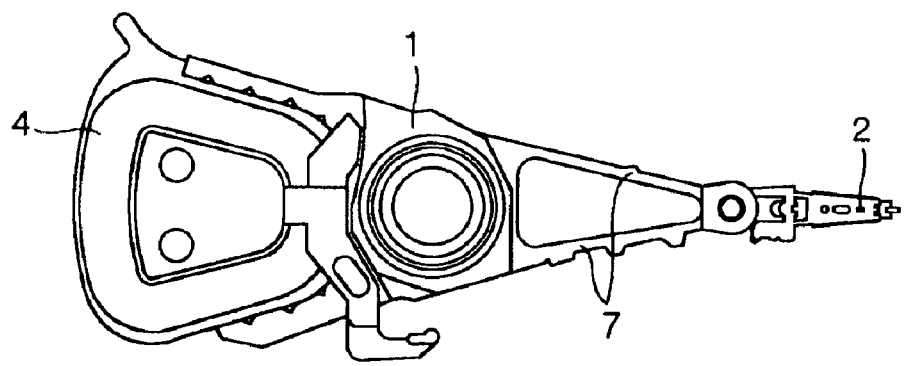
FIG. 9 is a top view of a carriage arm assembly according to a second embodiment of the present invention.
Figure 10:
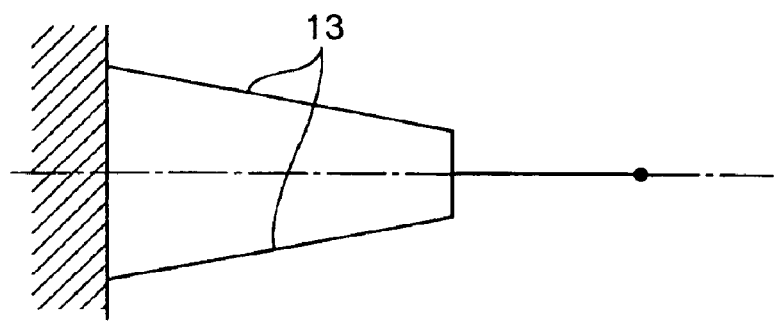
FIG. 10 is a schematic view of the second embodiment of the present invention.
Figure 11:
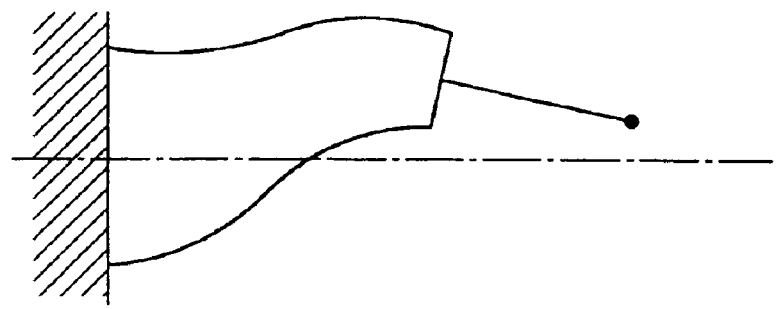
FIG. 11 is a drawing showing principles of operation of the second embodiment of the present invention.

FIG. 9 is a top view of a carriage arm assembly according to a second embodiment of the present invention. In the embodiment in FIG. 1 to FIG. 3, the widths of the front end area 8 of the arm member and the back end area 9 of the arm member of the carriage arm 7 are smaller than the width of the central area 10 of the arm member. On the other hand, in the embodiment in FIG. 9, the width of each arm member of the entire carriage arm 7 is reduced. This makes it possible to reduce the weight of the carriage arm, thus reduce inertial moment of the entire carriage arm assembly, which allows the time required for an access operation to be shortened. FIG. 10 shows a drawing of principles of operation. In the case of FIG. 10, the width of the entire carriage arm 7 is small, and therefore the carriage arm assembly can be modeled as elastic beams 13 instead of the rigid link mechanism as shown in FIG. 4. FIG. 11 shows a case where the carriage arm 7 is deformed. As with the case of FIG. 5, it is also understandable that this is the configuration with reduced displacement of the head.

Figure 12:
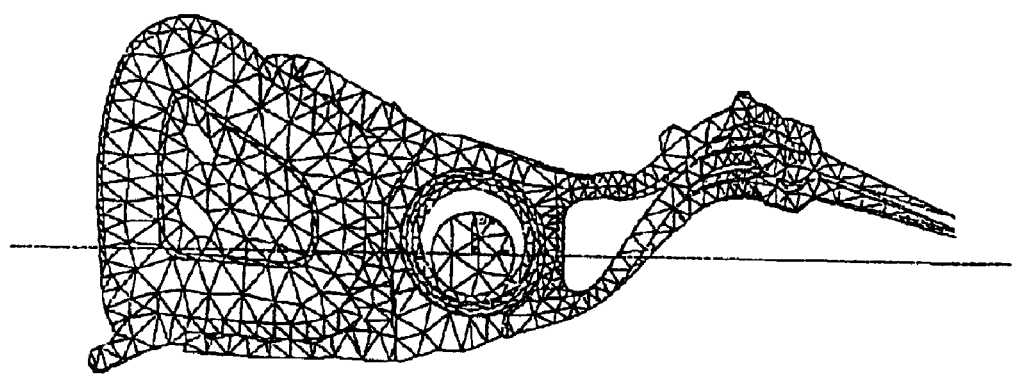
FIG. 12 is a finite element analysis result in a main resonance mode of the second embodiment of the present invention.
Figure 13:
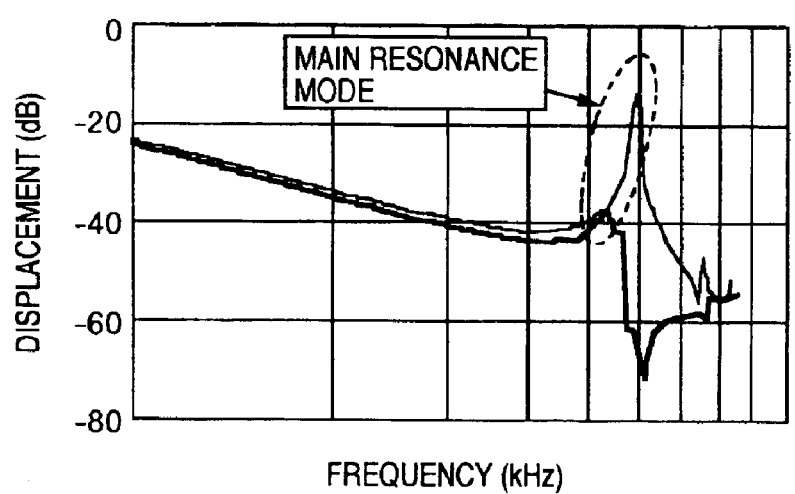
FIG. 13 illustrates a transfer characteristic of the second embodiment of the present invention.

FIG. 12 shows the shape of a main resonance mode which is analyzed using a finite element analysis method, and FIG. 13 shows a transfer characteristic. As with the case of FIG. 7 and FIG. 8, it is also understandable in this case that the amplitude of the main resonance mode is small, while there is sufficient displacement so that the phase will not be inverted.

As shown above, it is also possible to widen the servo band width in the second embodiment compared to the conventional system, and therefore it is possible to reduce positioning errors, and improve recording density, and at the same time, the phase of the magnetic head is not inverted even if the shape of the main resonance mode changes due to manufacturing variation and variation in the operating environment, and therefore the present invention is applicable to an actual magnetic disk apparatus.

Embodiment 3

Figure 14:
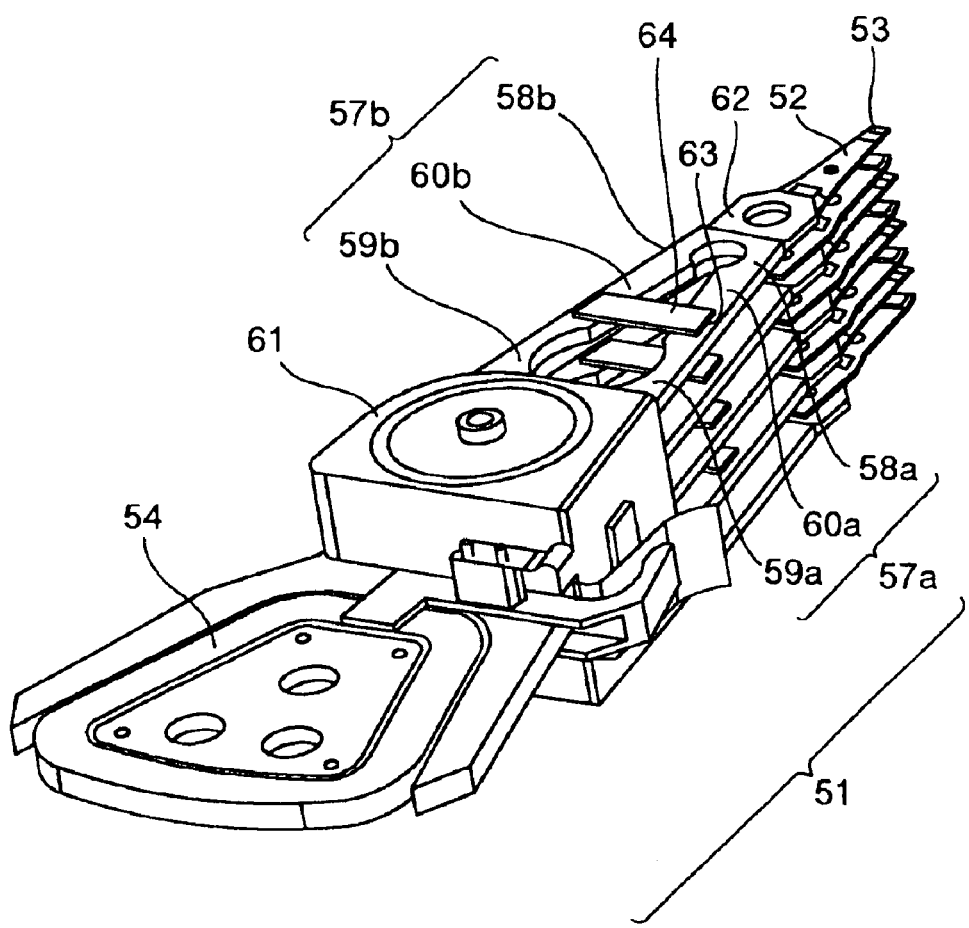
FIG. 14 is a perspective view of a carriage arm assembly according to a third embodiment of the present invention.
Figure 15:
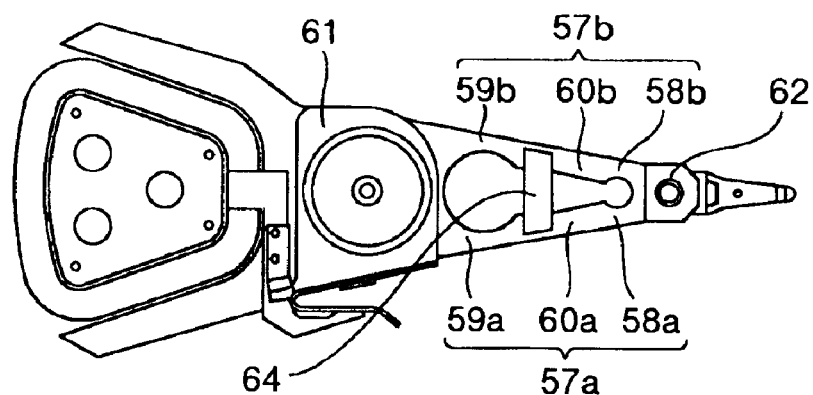
FIG. 15 is a top view of the carriage arm assembly according to the third embodiment of the present invention.
Figure 16:
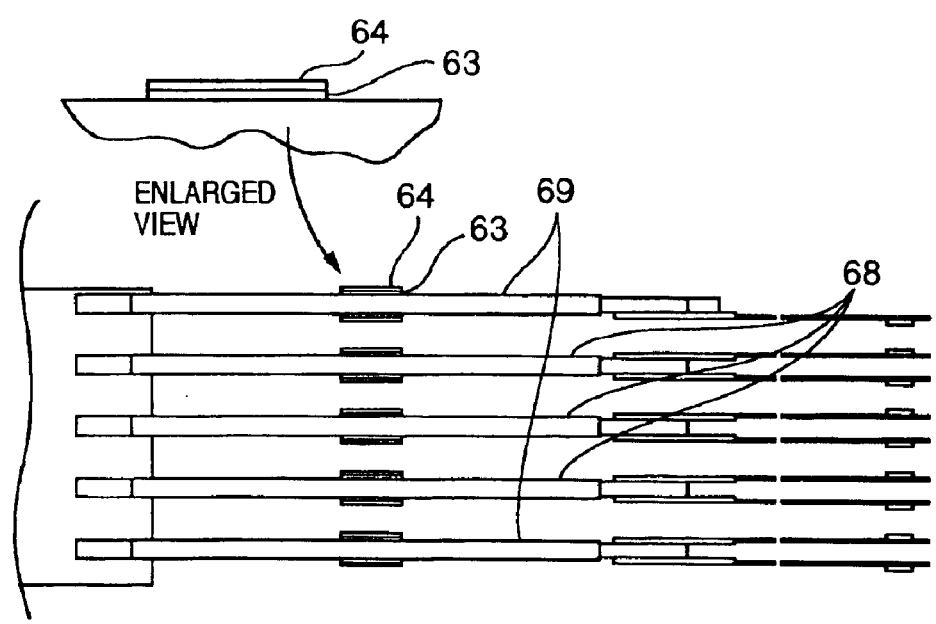
FIG. 16 is a side view of the carriage arm assembly according to the third embodiment of the present invention.
Figure 17:
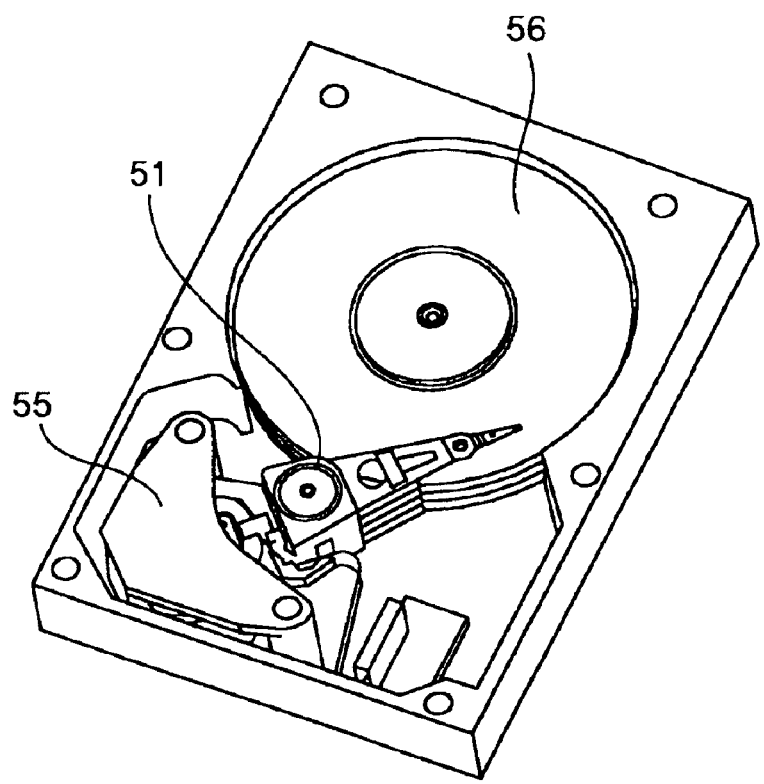
FIG. 17 is a perspective view of the magnetic disk apparatus using the third embodiment of the present invention.

FIG. 14 is a perspective view of a carriage arm assembly according to a third embodiment of the present invention, and FIG. 15 is a top view of the carriage arm. FIG. 16 is a side view of the carriage arm. Furthermore, FIG. 17 shows an example of a magnetic disk apparatus incorporating the carriage arm assembly of the present invention. A slider 53 including a magnetic head (not shown) is mounted at the end of a carriage 51 via a suspension 52. When a current flows through a coil 54, a force is generated between a voice coil motor 55 and the coil 54, the carriage 51 rotates centered on the bearing section 61 around a rotation axis parallel to a rotation axis of the disk, and can thereby position the slider 53 at an arbitrary radial position (target track) on a disk 56.

The carriage 51 is the same as that of the first embodiment in which the carriage arm members 57a and 57b have a configuration such that the widths of the arm front end areas 58a and 58b and the arm back end areas 59a and 59b have widths smaller than the widths of the arm central areas 60a and 60b.

Here, with respect to subscripts "a" and "b" in FIG. 15, the right side in the direction seen from the body 61 to the suspension fixing portion 12 is expressed with subscript "a", and the left side is expressed with subscript "b". For example, 58a is a front end of the arm member 57a. The arm members 57a and 57b are provided within a plane parallel to the disk surface.

A restricting plate (restricting member) 64 is pasted to the planes of the arm central areas 60a and 60b so as to be parallel to the disk surface just like a bridge through a damping member 63, that is, the arm central areas 60a and 60b are connected through the damping member 63. Here, a high polymer material having viscoelasticity (hereinafter referred to as "viscoelastic body") is used as the damping member 63. This is because the damping member 63 itself has adhesiveness and it can easily be pasted to the arm members and is convenient for assembly. Of course, the damping member 63 can be substituted by a member having a high damping effect such as rubber. In this example, the restricting plate 64 is a stainless steel plate of 50 to 200 μm thick, and the visco-elastic body 63 is an adhesive material of 50 to 100 μm thick and also serves as a member supporting the restricting plate 64 onto the central areas 60a and 60b. The restricting plate (restricting material) 64 is made of a rigid material having higher rigidity than the visco-elastic body 63 (however, different from rigid sections 65).

Figure 18:
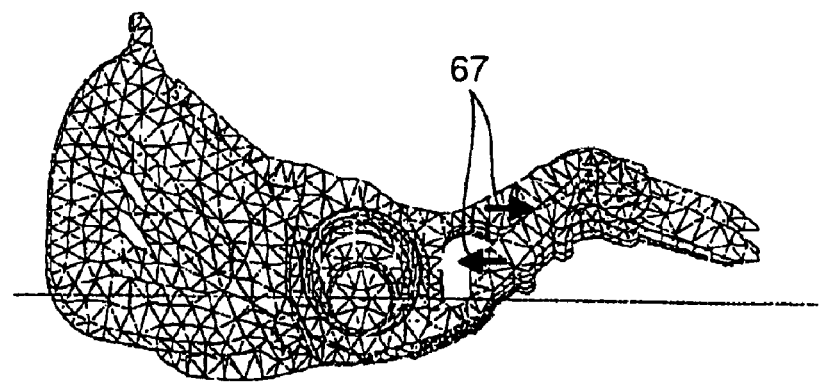
FIG. 18 illustrates deformation of the third embodiment of the present invention.
Figure 19:
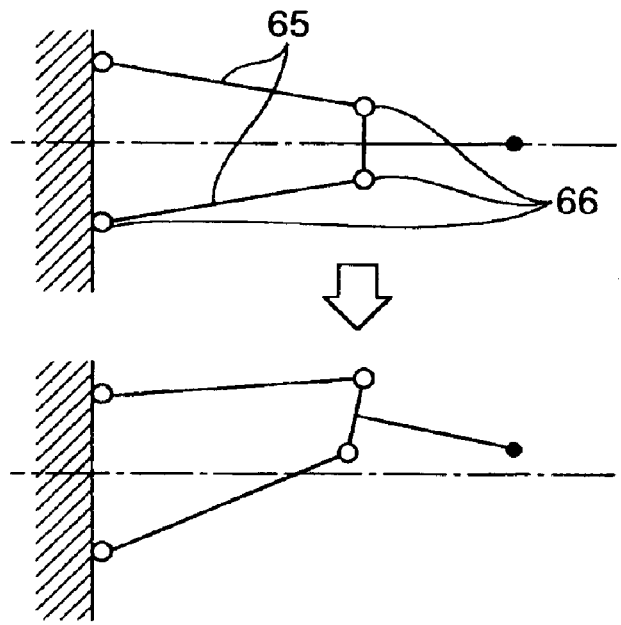
FIG. 19 is a drawing showing a model of deformation principles of the third embodiment of the present invention.

FIG. 18 illustrates a deformed shape of the carriage arm assembly in the main resonance mode. Since the widths of the arm front end areas 58a and 58b and arm back end areas 59a and 59b are smaller than the widths of the arm central areas 60a and 60b, as shown in the arm shape in FIG. 15, the carriage arm assembly can therefore be modeled with a 4-node link structure virtually expressed with rigid sections 65 and rotation sections 66 as shown in FIG. 19. At this time, the central areas 60a and 60b corresponding to the rigid sections 65 move so as to rotate around the back end area 59a or 59b as fulcrums, so that relative displacement is produced as indicated by arrows 67 in FIG. 18. At this time, since the restricting plate 64 has sufficient rigidity, the length is invariable, so that shear strain in the viscoelastic body 63 is produced in the in-plane direction. The visco-elastic body 63 converts this distortion energy to thermal energy, and thereby dissipates it so as to produce a damping effect. According to this mechanism, if the distortion of the viscoelastic body 63 is large, that is, the greater the relative displacement between the restricting plate 64 and the central areas 60a and 60b of the respective arm members, the greater the energy consumed, enhancing the damping effect. Furthermore, it is understandable that the greater the area of the visco-elastic body 63 pasted to the central areas 60a and 60b of the arm members, the more energy is consumed in more parts so as to enhance the damping effect.

Figure 25:
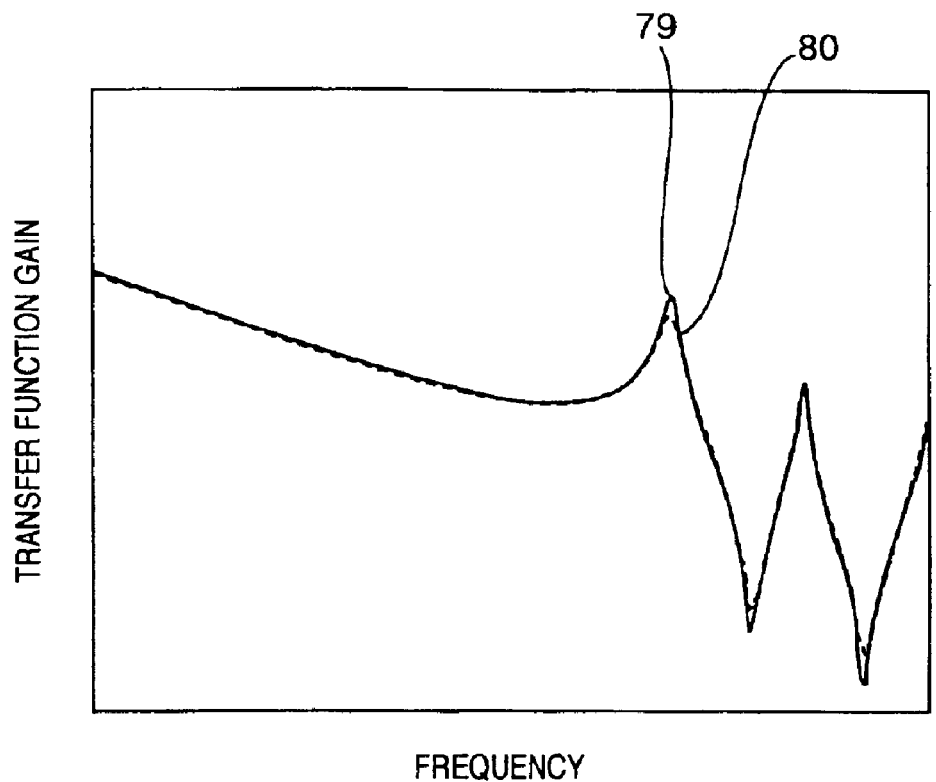
FIG. 25 illustrates a transfer characteristic of the third embodiment of the present invention.
Figure 26A:
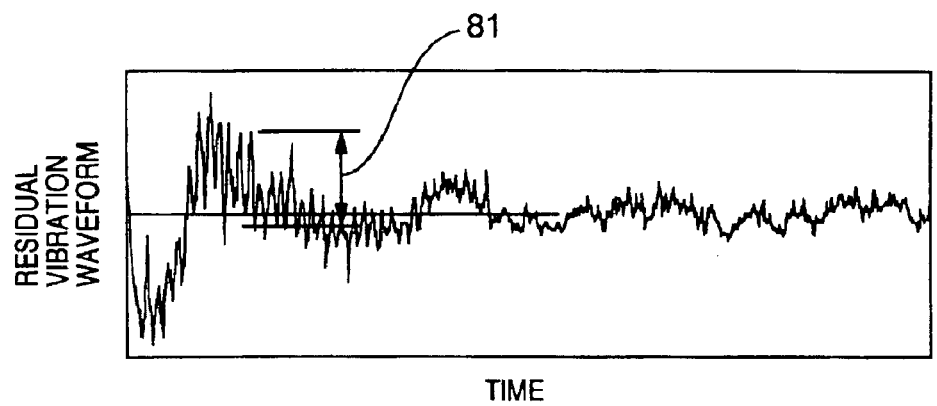
FIGS. 26A and 26B illustrate positioning residual vibration waveforms of the third embodiment of the present invention.
Figure 26B:
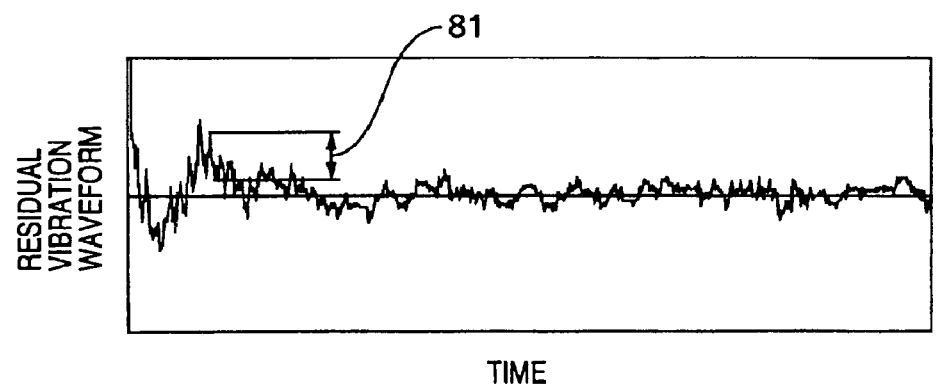

Increasing the servo band width requires to increase the frequency in the main resonance mode, which is a primary vibration mode of the carriage, or to reduce a gain in a transfer characteristic in which the force generated in the coil is defined as an input, and the displacement of the magnetic head in the positioning direction is defined as an output. FIG. 25 shows an effect of the present invention with respect to the transfer characteristic. Compared to the transfer characteristic 79 when the present invention is not used, the gain in the main resonance mode reduces with the transfer characteristic 80 when the present invention is used. Furthermore, FIGS. 26A and 26B show a signal of deviation from a target track when the head comes close to the target track during a positioning operation. FIG. 26A shows a waveform in a case where the present invention is not used, and FIG. 26B shows a waveform in a case where the present invention is used. It is understandable that the frequency and amplitude with a high frequency indicated by an arrow 81 is reduced.

As shown in FIG. 16, this embodiment adopts a configuration whereby the restricting plates 64 are pasted to all arms through the viscoelastic bodies 63. This makes it possible to obtain a damping effect during bending and deformation of all the arms. However, in the case of the carriage of which all the arms coupled with the body 61, the vibration mode involving in-plane bending of the arm represented by the main resonance mode is the vibration mode in which the entire carriage is deformed as one structure and even if a section of producing a damping effect is provided partially, the damping ratio with respect to the vibration mode in the carriage as the entire system increases, and therefore vibration of all the arms can also be reduced.

Accordingly, by pasting the restricting plates 64 and viscoelastic bodies 63 only to the outside arms 69 without pasting the restricting plates 64 and viscoelastic bodies 63 to all the arms 68 in the intermediate area shown in FIG. 16, it is possible to give a damping effect against vibration of all the arms. This means that, in the actual magnetic disk apparatus, by pasting the restricting plates 64 to the arms 69 at both ends of the carriage arm using viscoelastic bodies 63, it becomes possible to reduce deterioration of the gain in the vibration mode involving the in-plane bending of the arm in the transfer characteristic at all the magnetic heads. Thus, by avoiding pasting the restricting plates 64 to the arms 68 in the intermediate section, it can be possible to reduce the number of pasting locations and thereby reduce assembly man-hours.

Figure 20:
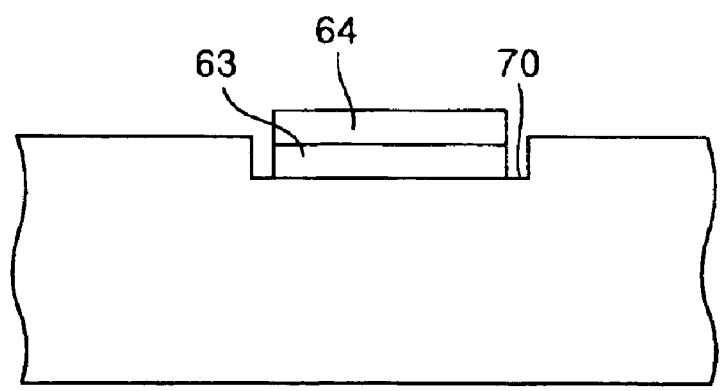
FIG. 20 is an enlarged view of the arm side of the third embodiment of the present invention.

In the height direction within the magnetic disk apparatus, a plurality of intermediate section arms 68 alternate with a plurality of disks 56. Therefore, there are often dimensional restrictions in the thickness direction of the arms. In such a case, by providing a groove 70 in the thickness direction as shown in FIG. 20 and pasting the restricting plate 64 inside through the viscoelastic body 63, it is possible to avoid increase in size in the thickness direction. In this case, by providing the groove 70, reduction of rigidity of the arm may be caused, however when considering in contrast to bending rigidity of beams, the thickness of the arm member only has a proportional influence on the rigidity in the in-plane direction of the arm, and therefore the reduction of rigidity is relatively small compared to the influence by the width of the arm member having a cubic influence in the in-plane direction. Especially in the case of this embodiment, since the place where the restricting plate 64 is pasted is the central areas 60a and 60b of the arm members widened so as to be regarded as a rigid body, the influence of the groove 70 on bending deformation of the arm members is very small.

Furthermore, with respect to bending rigidity in the out-of-plane direction of the arm, though the visco-elastic body 63 is inserted, the high rigidity restricting plate 64 is attached outside, so that it is possible to considerably reduce deterioration of the rigidity in the out-of-plane direction by providing the groove 70. Furthermore, when distortion concentration on the groove 70 is considered, the distortion occurs in the visco-elastic body 63 and it is also possible to achieve the effect of attenuating the out-of-plane vibration of the arm.

When the restricting plate 64 is pasted to the central areas 60a or 60b of the arm member in the assembly process, it is desirable to paste the visco-elastic body 63 only to the areas where the restricting plate 64 faces the central area 60a or 60b. This is because even if the visco-elastic body 63 is placed in the exposed area in the space between the central areas 60a and 60b of both arm members of the planes facing the arms of the restricting plate 64, and if the rigidity of the restricting plate 64 is sufficient, no distortion is generated in the visco-elastic body 63, and therefore no damping effect is expected thereby. Furthermore, if a large part of the viscoelastic body 63 is exposed, a part of the viscoelastic body 63 may be peeled off and may convert to dust particles on a microscopic scale. This feature also has the effect of avoiding those. Another method of solving this problem is to paste an additional restricting plate to the visco-elastic body 63 exposed in the space between the central areas 60a and 60b of this arm member. This provides an advantage of improving the rigidity of the restricting plate 64.

Embodiment 4

Figure 21A:
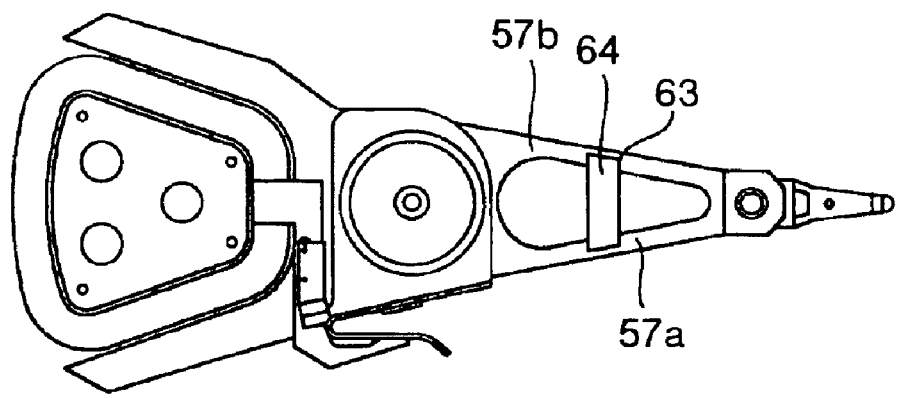
FIGS. 21A and 21B are top views of a carriage arm assembly according to a fourth embodiment of the present invention.
Figure 21B:
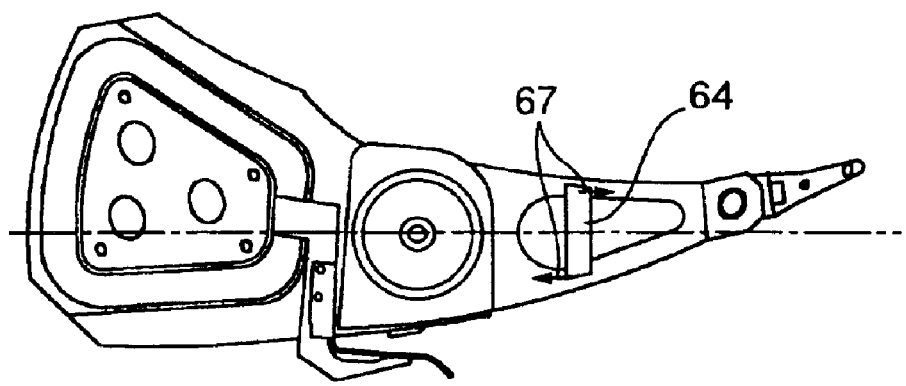

FIG. 21A and FIG. 21B show a fourth embodiment of the present invention. As shown in FIG. 21A, the widths of the arm members 57a and 57b of the carriage arm are constant, and the dimensions such as the thickness, length and rigidity, etc. of the arm members 57a and 57b are designed so as to produce an arm deformation as shown in FIG. 21B. In this case, also, a relative displacement occurs near the intermediate area of the arm members 57a and 57b, and therefore distortion occurs in the viscoelastic body 63 below the restricting plate 64, so that the above-described mechanism makes it possible to achieve a damping effect, which makes the arm members 57a and 57b gradually bendable over the entire area of the arm members, which makes the relative displacement near the central area smaller than that of the third embodiment and reduces the damping effect. Furthermore, by increasing the width of the arm members to increase the area to which the viscoelastic body 63 is pasted, the bending rigidity of the arm members increases, so that the amount of deformation is reduced and thereby the damping effect is reduced, however when overall rigidity of the arm member 57 increases, the resonance frequency in vibration mode involving in-lane bending of the arm including the main resonance mode can be increased.

Embodiment 5

Figure 22:
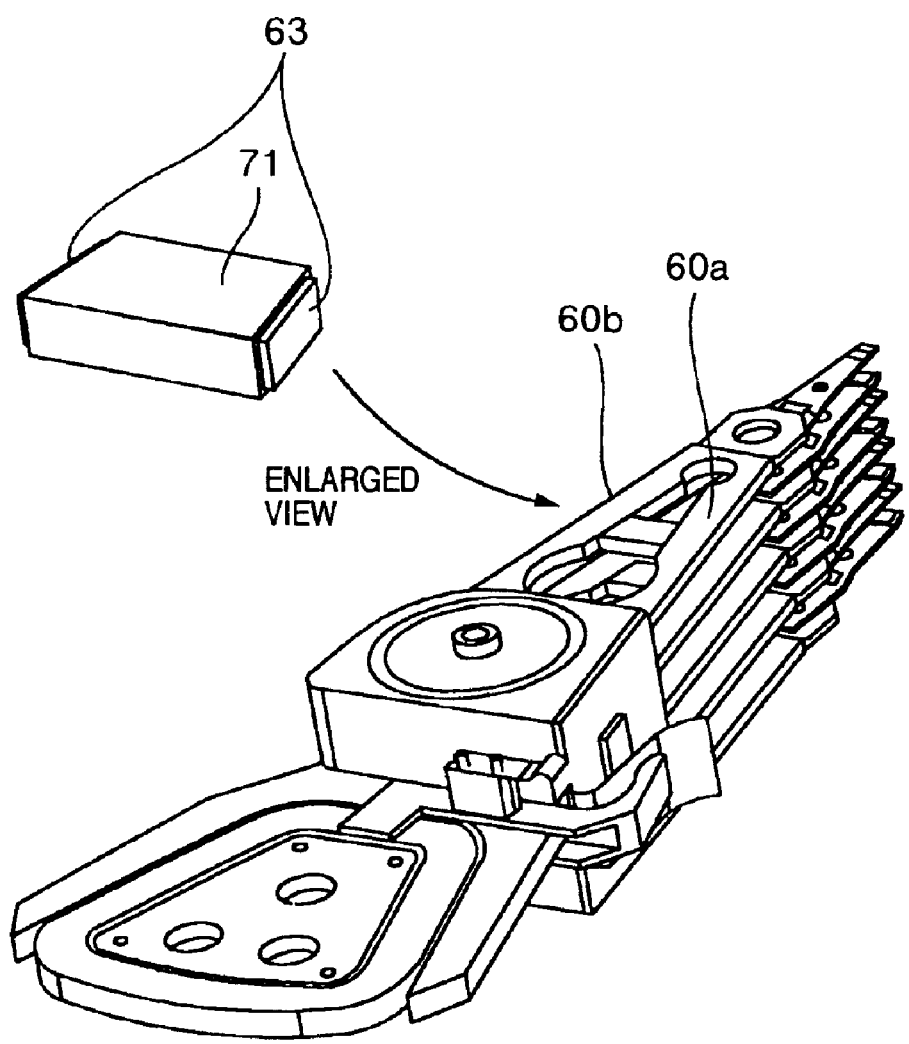
FIG. 22 is a perspective view of a carriage arm assembly according to a fifth embodiment of the present invention.

FIG. 22 shows a fifth embodiment of the present invention. As with the case of the third embodiment, the shape of the carriage arm has a configuration that the widths of the front end areas 58a and 58b and the arm back end areas 59a and 59b of the arm members 57a and 57b of the carriage arm are smaller than the widths of the central areas 60a and 60b of the arm members. Furthermore, a restricting member 71, whose enlarged view is shown in the figure, is inserted between the central areas 60a and 60b using two viscoelastic bodies 63. As with the case of the third embodiment, this produces distortion in the viscoelastic body 63 under the restricting member 71 with respect to relative displacement of the central areas 60a and 60b of the arm member, so as to generate a damping effect. In this case, by making the thickness of the restricting plate 71 equivalent to that of the arm, the dimensional increase in the out-of-plane direction of the arm can be suppressed. Furthermore, even if the restricting plate 71 is pasted to all the arms or pasted to some arms, the aspect that the damping effect can be expected for all the arms is the same as the case of the third embodiment.

Embodiment 6

Figure 23:
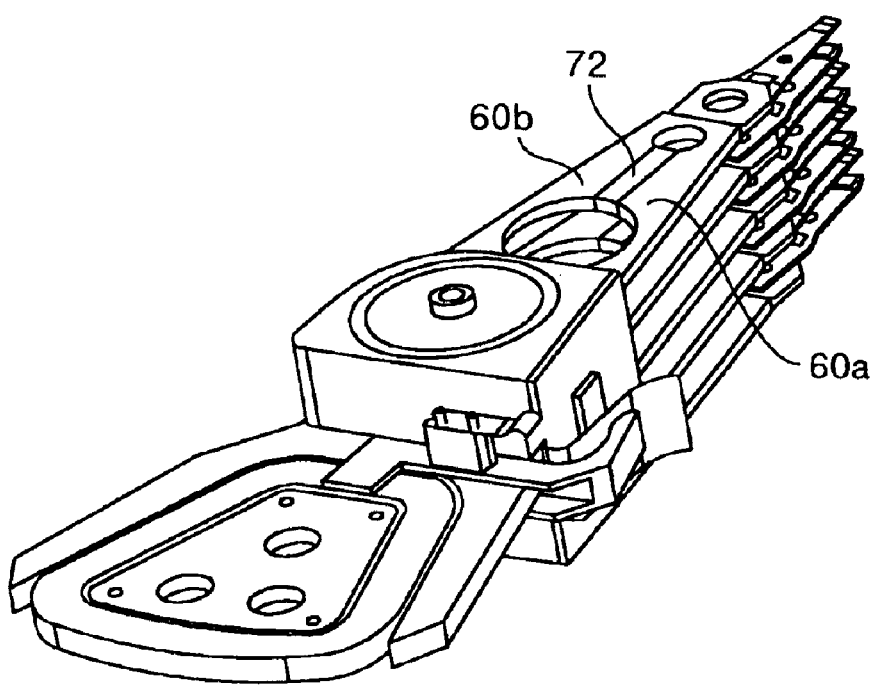
FIG. 23 is a perspective view of a carriage arm assembly according to a sixth embodiment of the present invention.

FIG. 23 shows a sixth embodiment. As shown in the case of the third and fifth embodiments, the carriage arm has a configuration in which the widths of the front end areas 58a and 58b and the back end areas 59a and 59b of the arm members 57a and 57b of the carriage arm are smaller than the widths of the central areas 60a and 60b. Here, the carriage has a configuration in which a thermoplastic damping material 72 is inserted along the shape of the central areas 60a and 60b of the arm members. For the damping material 72, it is desirable to mix a visco-elastic body with a high damping effect with thermoplastic resin and shape it or use an elastic material with a high damping effect such as rubber. This embodiment has no restricting material, contrary to the case of the third to fifth embodiments, however the central areas 60a and 60b of the arm members have dual functions of the restricting materials to produce distortion in the damping material 72 when relative displacement occurs, and can thereby generate a damping effect similar to that explained so far. Such a configuration eliminates the need for a restricting material and simplifies the structure.

Figure 24:
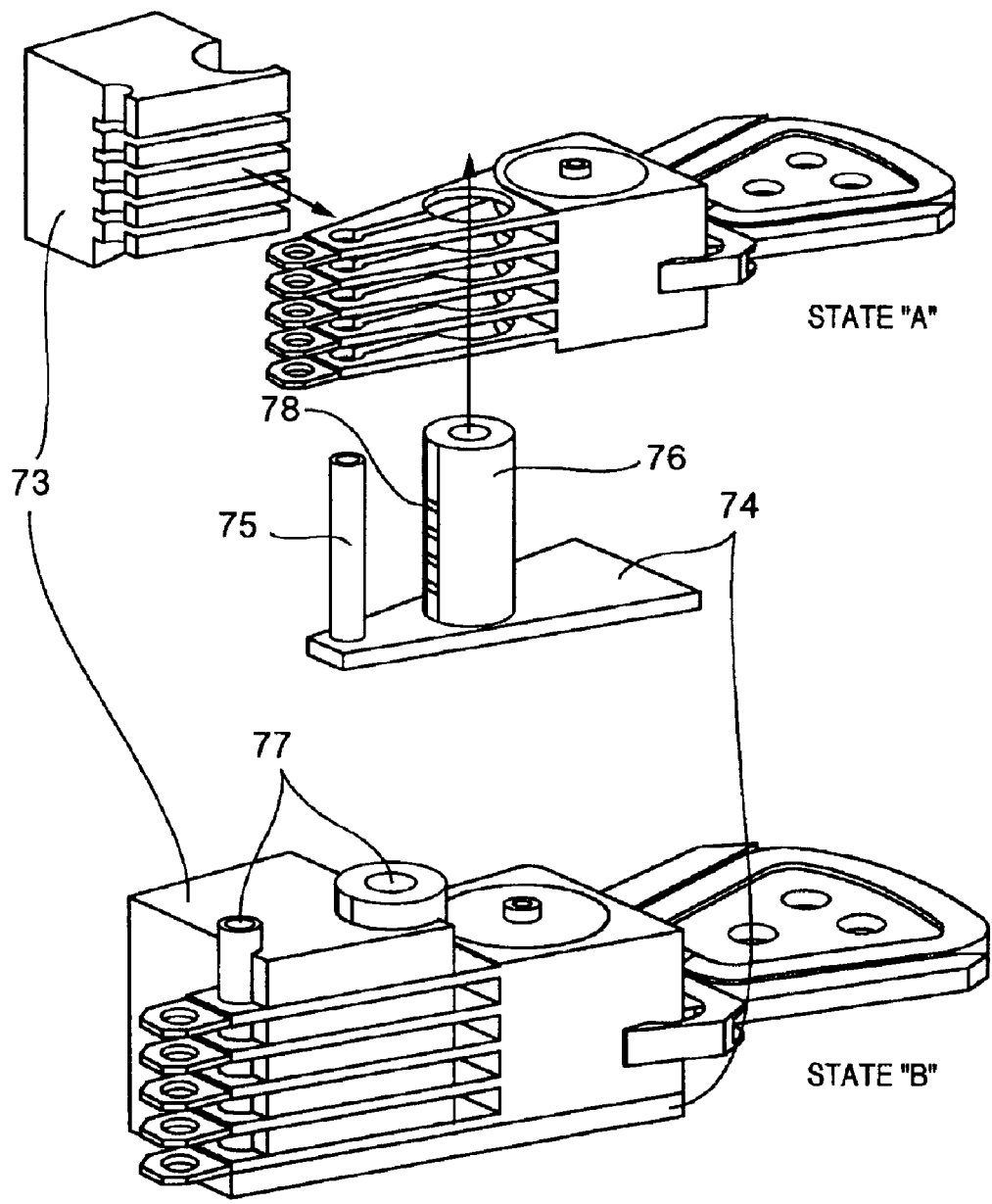
FIG. 24 illustrates assembly of the carriage arm according to the sixth embodiment of the present invention.

FIG. 24 shows an assembling method according to the sixth embodiment. In a state "A" before the suspension 52 is attached, a horizontal mold 73 is inserted between the arms in the in-plane direction. Furthermore, the vertical mold 74 is inserted from the outside of the plane in a state "B". The vertical mold 74 is provided with cylinders 75 and 76 whose external shape is determined according to the holes perforated between the arm members 57a and 57b, and tubes 77 are provided on the central axis line. Furthermore, nozzles 78 are provided on sides of the cylinders 76 and 77 corresponding to the arm positions. In the state "B", a space surrounded by the horizontal mold 73 and vertical mold 74 is formed between the central areas 10a and 10b of the arm member. In this state, a damping material melted at a high temperature is extruded and molded into the above-described space from one side of the tube 77 through the nozzles 78, cooled down, and hardened after a predetermined time, so that the damping material 72 is molded in this way. In the above process, the damping material 72 is molded near the center of the arm member. FIG. 23 shows a flat plane as the planes of the arm member central areas 60a and 60b facing the damping section 72, however the plane is not limited to a flat plane, and it is further desirable to provide projections and depressions to increase the area of contact with the damping material 72. The assembly process shown in FIG. 24 allows the damping material 72 to be molded simultaneously for all arms, and therefore it is effective to provide the damping material 72 for all arms, however, of course, it is also possible to give the damping material 72 only to some arm members as in the cases of the foregoing embodiments.

By using the carriages according to the third to sixth embodiments of the present invention, it is possible to achieve high damping effects for various vibration modes involving in-plane bending of arms. Especially, it is possible to widen the servo band width and improve the positioning accuracy by reducing the gain in the transfer function in the main resonance mode and provide a magnetic disk apparatus with high recording density. Furthermore, it is possible to reduce residual vibration during an operation of positioning the head in the target mode, improve the reading/writing speed, and provide a magnetic disk apparatus with high-speed transfer capability.

In the above-described explanations, "arm in-plane bending primary mode" refers to a mode of deforming each of a plurality of arm members just like primary bending of a cantilever, and refers to the same vibration mode as the "end arm mode" in the above-described literature "Active Damping in HDD Actuator". Furthermore, the "in-plane direction" means the direction along the plane parallel to the disk plane, and the "out-of-plane direction" means the axial line direction perpendicular to the disk plane. Furthermore, the vertical/horizontal ratio and the dimensional ratio among different sections in the drawings used for convenience of explanation in the explanations do not necessarily reflect correct values.

The present invention can reduce the displacement of the magnetic head in the main resonance mode, and prevents the phase of the magnetic head from inverting in the case that machining tolerance and ambient temperature change, and can thereby implement a magnetic disk apparatus capable of improving its recording density and having large recording capacity by widening the servo band width, improving the positioning accuracy, and reducing positioning errors.

Furthermore, the present invention can give a high damping effect to various vibration modes accompanied by in-plane bending of the arm, reduce vibration of the carriage, and reduce positioning errors, and can thereby provide a magnetic disk apparatus with high recording density. The present invention can also provide a magnetic disk apparatus allowing high-speed transfers by reducing residual vibration during a head positioning operation, and improving the reading/writing speed.

It should be further understood by those skilled in the art that the foregoing description has been made on embodiments of the invention and that various changes and modifications may be made in the invention without departing from the spirit of the invention and the scope of the appended claims.

What is claimed is:

1. A carriage arm assembly for swingably supporting a magnetic head, comprising:
   a slider on which the magnetic head is mounted;
   a suspension carrying the slider;
   a carriage arm to which the suspension is attached; and
   a body section provided at a base end of the carriage arm, which body section extends so as to completely surround a rotational axis, and is rotatable around the rotational axis so as to swing the magnetic head, wherein
   the carriage arm comprises first and second arm members extending from a distal side portion of the body section which completely surrounds the rotational axis, the distal side portion of the body section being disposed at a position between the rotational axis and the magnetic head and substantially away from the rotational axis in a direction toward the magnetic head, the first and second arm members being substantially in parallel with a swinging plane of the carriage arm, and a fixing portion provided at a distal end of the carriage arm for mounting the suspension thereon, and wherein
   each of the first and second arm members comprise low rigidity sections in a distal end area and a base end area thereof, the rigidity of the low rigidity sections being lower than that of an intermediate area of the first and second arm members, so that the carriage arm assembly is easily deformed in the distal and base end areas of the first and second arm members.

2. The carriage arm assembly according to claim 1, wherein each of the first and second arm members has narrow sections in the distal and base end areas thereof, the widths of the narrow sections being narrower than that of the intermediate area of the first and second arm members, so that said low rigidity sections are provided in the distal and base end areas.

3. The carriage arm assembly according to claim 1, wherein first and second arm members and said fixing portion are integrated to form said carriage arm.

4. The carriage arm assembly according to claim 1, wherein the first and second arm members are coupled with each other in the intermediate areas thereof by means of a coupling member comprising a damping member.

5. The carriage arm assembly according to claim 1, wherein, in a main resonance mode corresponding to a primary vibration mode in an approximate positioning direction, magnetic head is displaced in a direction same with that of the fixing portion of the carriage arm, the amount of displacement of the magnetic head being smaller than that of the fixing portion.

6. The carriage arm assembly according to claim 5, wherein the amount of displacement of the magnetic head is greeter than 0.

7. A carriage arm assembly for swingably supporting a magnetic head, comprising:

a slider on which the magnetic head is mounted;

a suspension carrying the slider;

a carriage arm to which the suspension is attached; and a body section provided at a base end of the carriage arm, which body section extends so as to completely surround a rotational axis, and is rotatable around the rotational axis so as to swing the magnetic head, wherein the carriage arm comprises first and second arm members which extend from a distal side portion of the body section which completely surrounds the rotational axis, the distal side portion of the body section being disposed at a position between the rotational axis and the magnetic head and substantially away from the rotational axis in a direction toward the magnetic head, the first and second arm members being substantially in parallel with a swinging plane of the carriage arm, and a fixing portion provided at a distal end of the carriage arm for mounting the suspension thereon, each of the first and second arm members comprise low rigidity sections in a distal end area and a base end area thereof, the rigidity of the low rigidity sections being lower than that of an intermediate area of the first and second arm members, so that the carriage arm assembly is easily deformed in the distal and base end areas of the first and second arm members, and the first and second arm members are coupled with each other in the intermediate areas thereof by means of a coupling member comprising a damping member.

8. The carriage arm assembly according to claim 7, wherein the coupling member further comprises a rigid member having higher rigidity than the damping member, both ends of the rigid member being attached to the first and second arm members via the damping member, so that the first and second arm members are coupled with each other.

9. A magnetic disk unit comprising a magnetic disk for storing information, a magnetic head for reading/writing the information from/to the magnetic disk, and a carriage arm assembly for swingably supporting the magnetic head above the magnetic disk, the carriage arm assembly comprising:

a slider on which the magnetic head is mounted;

a suspension carrying the slider;

a carriage arm to which the suspension is attached; and a body section provided at a base end of the carriage arm, which body section extends so as to completely surround a rotational axis, and is rotatable around the rotational axis so as to swing the magnetic head above the magnetic disk, wherein the carriage arm comprises first and second arm members which extend from a distal side portion of the body section which completely surrounds the rotational axis, the distal side portion of the body section being disposed at a position between the rotational axis and the magnetic head and substantially away from the rotational axis in a direction toward the magnetic head, the first and second arm members being substantially in parallel with a swinging plane of the carriage arm, and a fixing portion provided at a distal end of the carriage arm for mounting the suspension thereon, and wherein each of the first and second arm members comprises low rigidity sections in a distal end area and a base end area thereof, the rigidity of the low rigidity sections being lower than that of an intermediate area of the first and second arm members, so that the carriage arm assembly is easily deformed in the distal and base end areas of the first and second arm members.

10. The magnetic disk apparatus according to claim 9, wherein the first and second arm members are coupled with each other in the intermediate areas thereof by means of a coupling member comprising a damping member.

11. A magnetic disk unit comprising a magnetic disk for storing information, a magnetic head for reading/writing the information from/to the magnetic disk, and a carriage arm assembly for swingably supporting the magnetic head above the magnetic disk, the carriage arm assembly comprising:

a slider on which the magnetic head is mounted;

a suspension carrying the slider;

a carriage arm to which the suspension is attached; and a body section provided at a base end of the carriage arm, which body section extends so as to completely surround a rotational axis, and is rotatable around the rotational axis so as to swing the magnetic head above the magnetic disk, wherein the carriage arm comprises first and second arm members which extend from a distal side portion of the body section which completely surrounds the rotational axis, the distal side portion of the body section being disposed at a position between the rotational axis and the magnetic head and substantially away from the rotational axis in a direction toward the magnetic head, the first and second arm members being substantially in parallel with a swinging plane of the carriage arm, and a fixing portion provided at a distal end of the carriage arm for mounting the suspension thereon, and wherein each of the first and second arm members comprises low rigidity sections in a distal end area and a base end area thereof, the rigidity of the low rigidity sections being lower than that of an intermediate area of the first and second arm members, so that the carriage arm assembly is easily deformed in the distal and base end areas of the first and second arm members, and the first and second arm members are coupled with each other in the intermediate areas thereof by means of a coupling member comprising a damping member.

* * * * *